United States Patent [19]

Legursky

[11] Patent Number: 5,244,430

[45] Date of Patent: Sep. 14, 1993

[54] TURKEY CALLER AND SUPPORT APPARATUS

[76] Inventor: Roy A. Legursky, HCR 64, Box 6493, Owego, N.Y. 13827

[21] Appl. No.: 921,622

[22] Filed: Jul. 30, 1992

[51] Int. Cl.⁵ .................. A63H 5/00; A63H 33/30; A45F 5/00
[52] U.S. Cl. ........................ 446/397; 446/26; 446/404; 224/222; 224/267
[58] Field of Search ............ 446/404, 397, 26; 224/219, 221, 222, 232, 267, 910

[56] References Cited

U.S. PATENT DOCUMENTS 4,343,108  8/1982  Lu ............................ 446/397
4,733,808  3/1988  Turner et al. ............ 224/267 X
4,753,377  6/1988  Poluhowich ............. 224/232 X
5,111,981  5/1992  Allen ........................ 446/397

Primary Examiner—Danton D. DeMille
Attorney, Agent, or Firm—Leon Gilden

[57] ABSTRACT

A support apparatus is arranged for the sliding reception and securement of a turkey caller therewithin permitting a hunter and the like to permit use of an associated turkey caller structure mounted within the support while permitting transport of accessory hunting equipment. The invention of the support includes a turkey caller assembly complementarily and slidably mounted within an associated support assembly arranged for ease of use and access by a hunter.

6 Claims, 4 Drawing Sheets

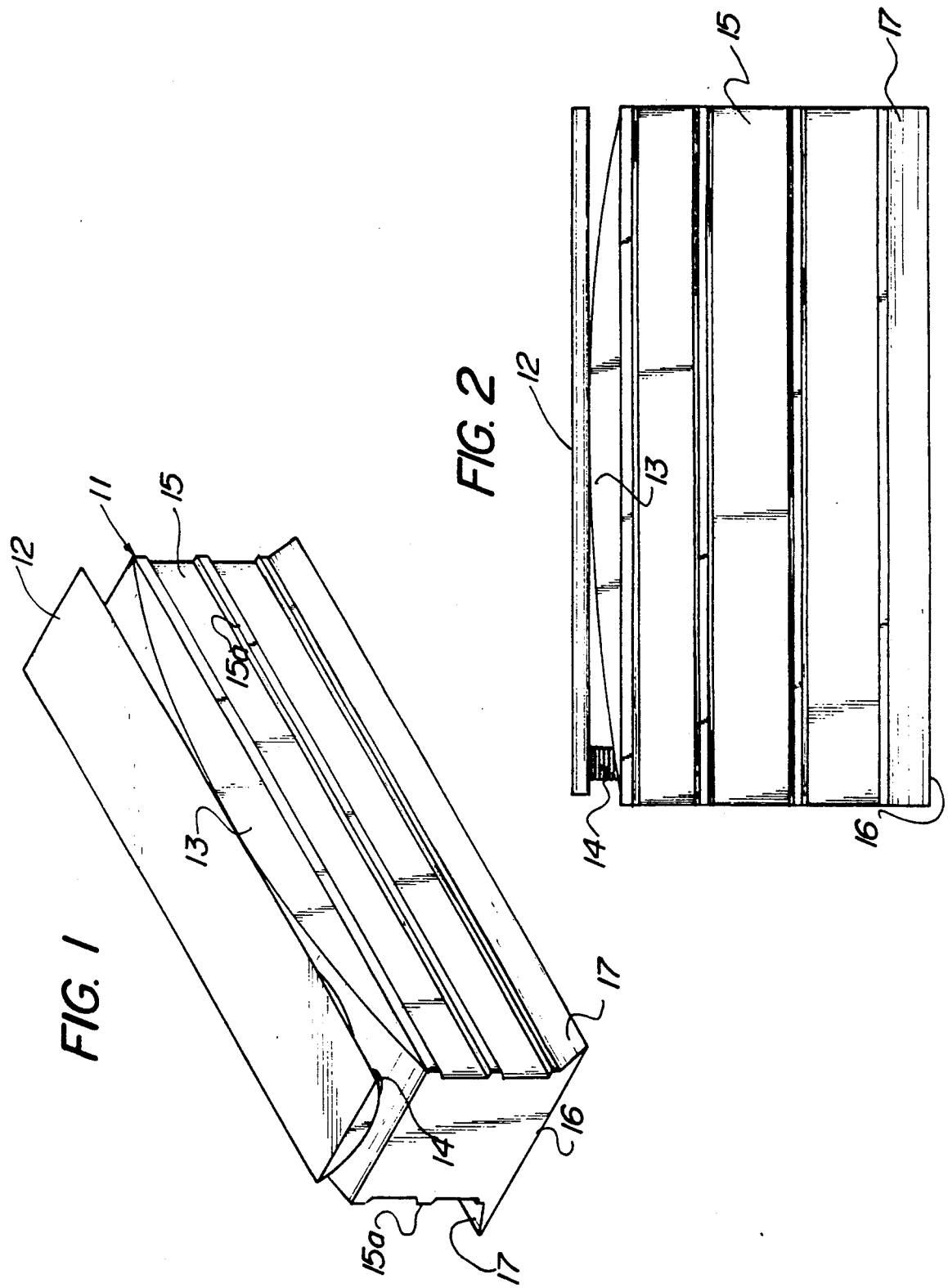

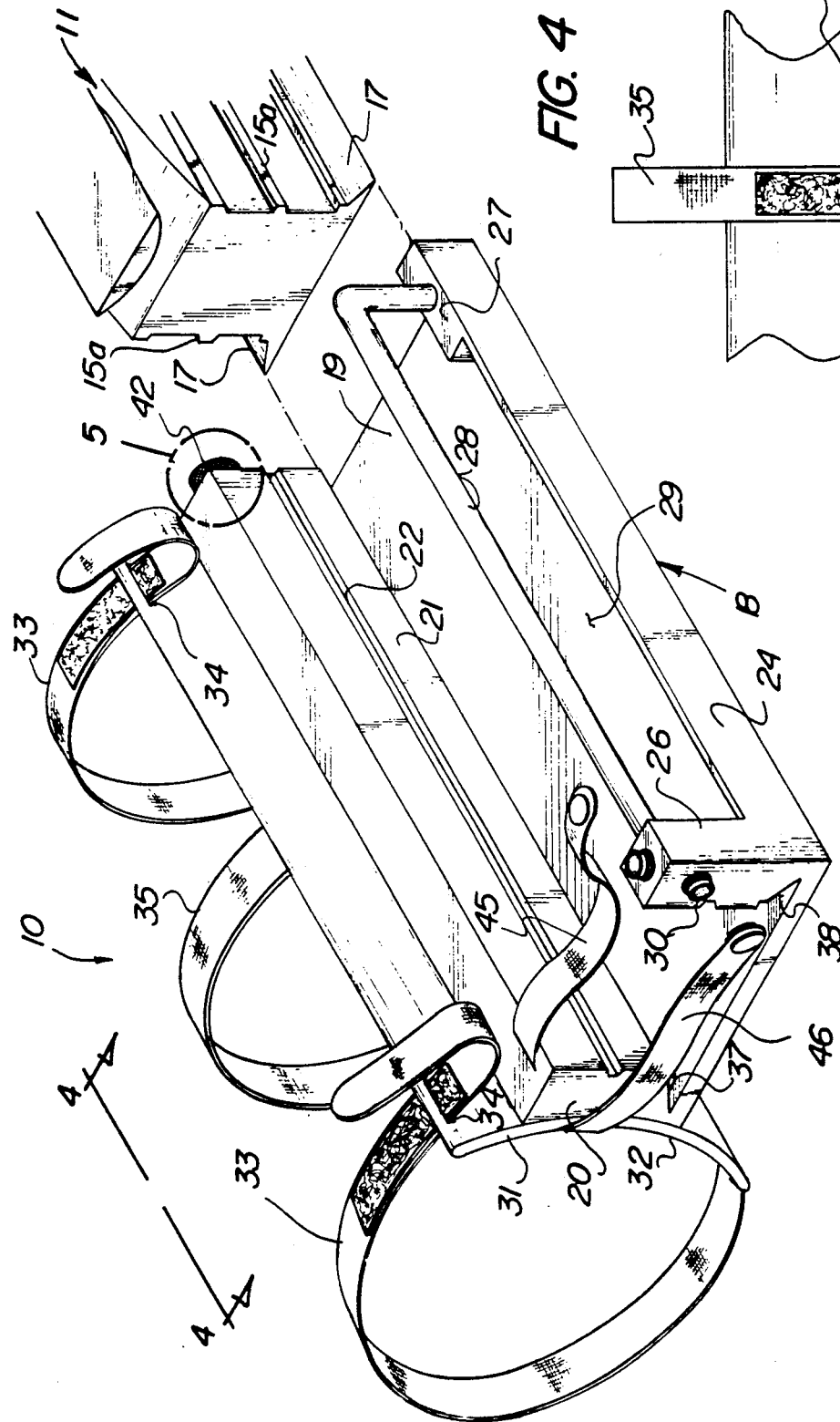
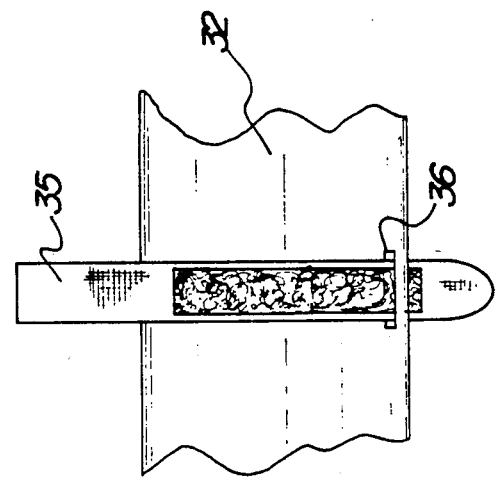

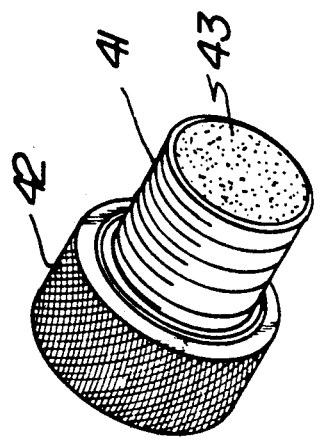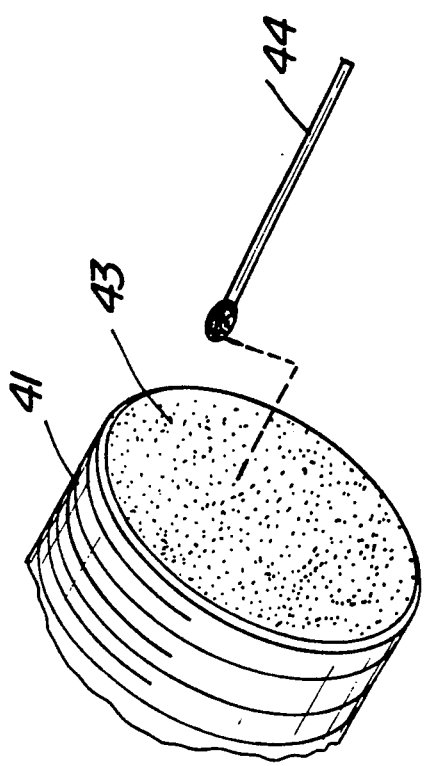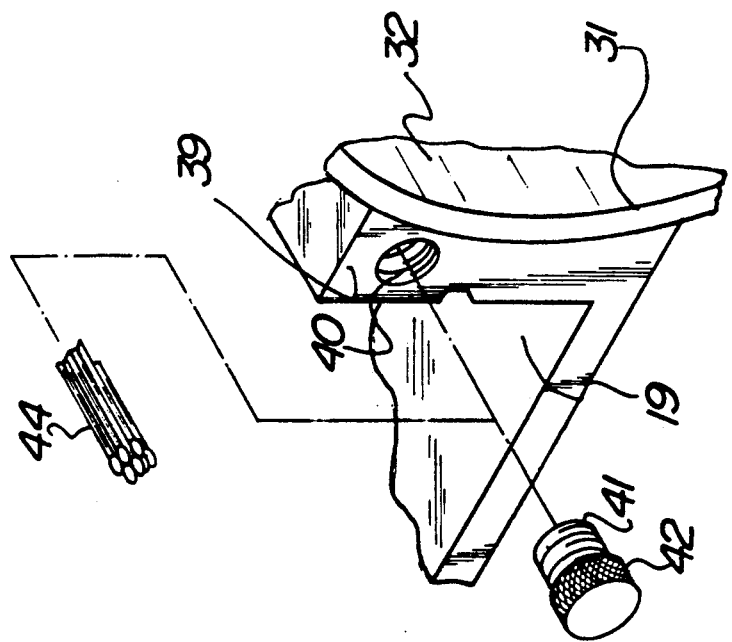

TURKEY CALLER AND SUPPORT APPARATUS

BACKGROUND OF THE INVENTION

1. Field of the Invention

The field of invention relates to turkey caller structure, and more particularly pertains to a new and improved turkey caller and support apparatus wherein the same is arranged for the ease of transport by a hunter during a hunting situation.

2. Description of the Prior Art

Turkey caller structure of various types have been utilized throughout the prior art and exemplified by U.S. Pat. No. 4,846,753 to Langston, wherein a turkey call includes a sound chamber operative through an overlying plate to effect generation of a turkey call.

U.S. Pat. Nos. 4,836,822; 4,988,325; 4,606,733; and 4,941,858 are each further examples of turkey caller structure as typified in the prior art.

Accordingly, it may be appreciated there continues to be a need for a new and improved turkey caller and support apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of turkey call apparatus now present in the prior art, the present invention provides a turkey caller and support apparatus wherein the same utilizes a turkey caller slidably and releasably mounted within an associated underlying support for securement to an individual's limb. As such, the general purpose of the present invention, which will be described subsequently in greater detail, is to provide a new and improved turkey caller and support apparatus which has all the advantages of the prior art turkey caller apparatus and none of the disadvantages.

To attain this, the present invention provides a support apparatus arranged for the sliding reception and securement of a turkey caller therewithin permitting a hunter and the like to permit use of an associated turkey caller structure mounted within the support while permitting transport of accessory hunting equipment. The invention of the support includes a turkey caller assembly complementarily and slidably mounted within an associated support assembly arranged for ease of use and access by a hunter.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved turkey caller and support apparatus which has all the advantages of the prior art turkey caller apparatus and none of the disadvantages.

It is another object of the present invention to provide a new and improved turkey caller and support apparatus which may be easily and efficiently manufactured and marketed.

It is a further object of the present invention to provide a new and improved turkey caller and support apparatus which is of a durable and reliable construction.

An even further object of the present invention is to provide a new and improved turkey caller and support apparatus which is susceptible of a low cost of manufacture with regard to both materials and labor, and which accordingly is then susceptible of low prices of sale to the consuming public, thereby making such turkey caller and support apparatus economically available to the buying public.

Still yet another object of the present invention is to provide a new and improved turkey caller and support apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a turkey caller structure utilized by the invention.

FIG. 2 is an orthographic side view of the turkey caller structure, as set forth in FIG. 1.

FIG. 3 is an isometric illustration of the invention.

FIG. 4 is an orthographic view, taken along the lines 4—4 of FIG. 3 in the direction indicated by the arrows.

FIG. 5 is an isometric illustration of section 5 as set forth in FIG. 3.

FIG. 6 is an isometric illustration of the plug member as utilized by the support assembly.

FIG. 7 is an isometric illustration of the plug assembly relative to the support assembly utilized by the invention.

DESCRIPTION OF THE PREFERRED EMBODIMENT

Figure 8:
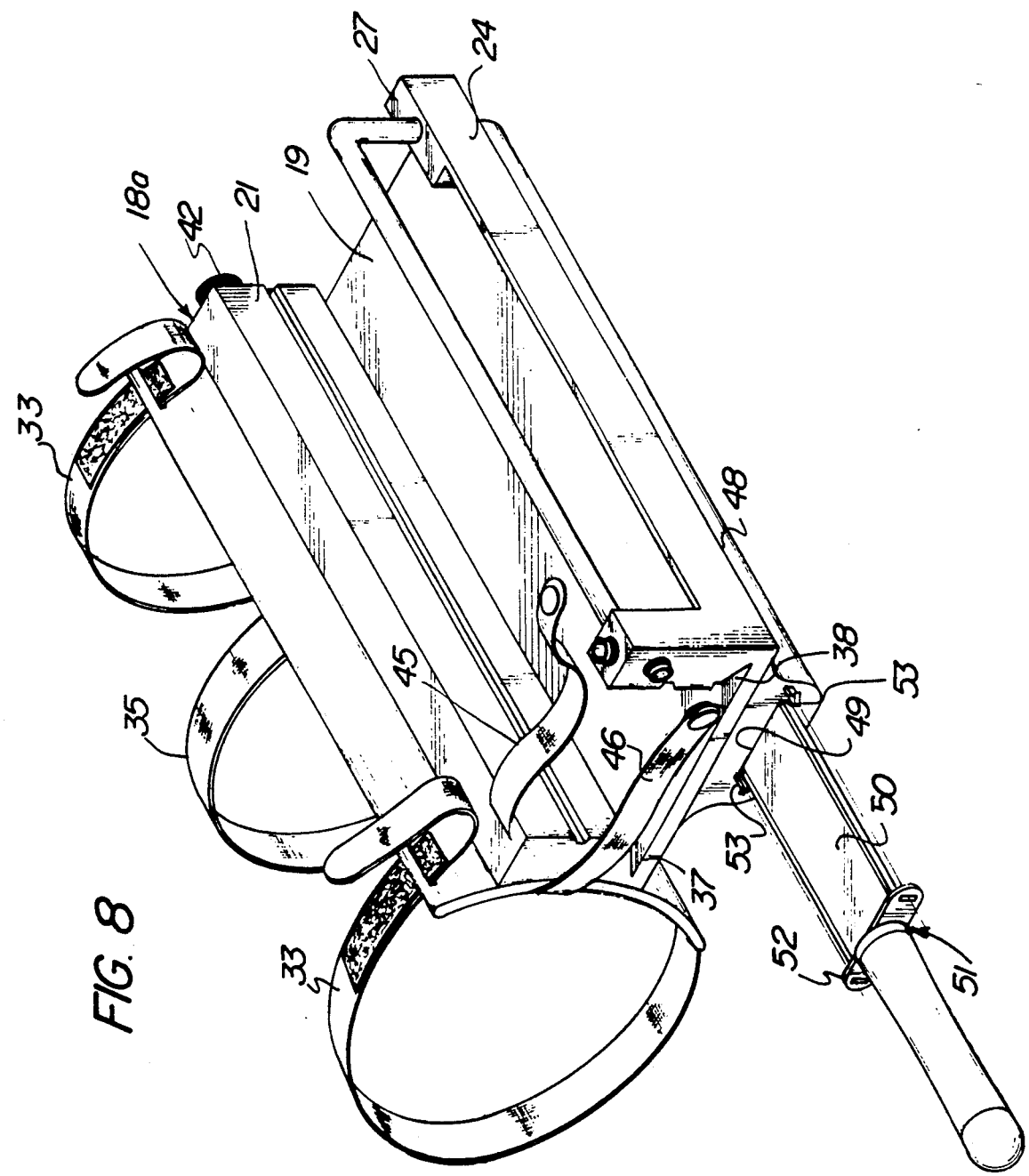
FIG. 8 is an enlarged isometric illustration of the support assembly employing an underlying knife support housing.

With reference now to the drawings, and in particular to FIGS. 1 to 8 thereof, a new and improved turkey caller and support apparatus embodying the principles and concepts of the present invention and generally designated by the reference numeral 10 will be described.

More specifically, the turkey caller and support apparatus 10 of the instant invention essentially comprises a turkey caller assembly 11 arranged for complementary and sliding reception within a support assembly 18, in a manner as indicated in FIG. 3. The turkey caller assembly 11 is of a type as indicated in the U.S. Pat. No. 4,846,753 incorporated herein by reference.

An actuator top plate 12 in the assembly 11 is in operative communication with an upper chamber 13 operative through a spring 14 to effect a turkey call emanating from the assembly 11, in a manner as indicated in the above noted U.S. patent. The side walls of the assembly 11 includes side wall ribs 15a that are arranged coextensively and parallel to a bottom wall 16 of the turkey caller assembly 11 and spaced an equal distance relative to the bottom wall in a parallel relationship. Dove tail flanges 17 extend beyond each side wall 15 at an intersection of each side wall relative to the bottom wall 16, with the flanges arranged coplanar with the bottom wall, as indicated and illustrated in the FIGS. 1 and 2.

A support assembly 18 includes a support assembly floor 19 orthogonally oriented relative to a support assembly first side wall 20 that is spaced from the parallel a support assembly second side wall 24. The first side wall 20 includes a first side wall interior surface 21 that is arranged in a confronting relationship relative to the second side wall 24. A first side wall interior surface groove 22 is arranged in a confronting parallel relationship relative to a first boss groove 30 to receive each side wall rib 15a of the side walls 15 of the turkey caller assembly 11. The second side wall boss 26 is orthogonally oriented relative to the support assembly floor 19 and wherein a generally L-shaped rail member 28 extends from the first boss 26 to a second boss 27, with the rail 28 oriented parallel relative to the first side wall 21 having an access opening 29 between the rail 28 and the first side wall for manual access to permit ease of manipulation of the turkey caller assembly 11 relative to the support assembly 18 for insertion and removal therefrom. An arcuate mounting plate 31 is fixedly mounted coextensively to the first side wall to an exterior surface thereof having a concave surface 32 formed to the mounting plate 31. The concave surface includes an upper edge and a lower edge arranged in a parallel relationship relative to one another, with first straps 33 mounted to the lower edge arranged for reception through first strap slots 34 arranged parallel to and adjacent the upper edge. A second strap 35 mounted to the upper edge is arranged for reception through a second strap slot 36 (see FIG. 4), wherein the second strap slot 36 is oriented relative to and parallel the lower edge of the mounting plate 31. The straps 33 and 35 each includes cooperative hook and loop surfaces to permit securement to themselves when directed through the associated slots 34 and 36 permitting the straps 33 and 35 for securement about an individual's arm for ease of transport of the organization in use. Further, the use of a first fastener elastomeric web 45 mounted to a second end wall portion of the first side wall is cooperative with a fastener mounted to an upper distal end of the first boss 26 for looping overlying the turkey caller assembly 11. The second fastener elastomeric web 46 is arranged for securement to a further snap fastener structure in limiting projection of the turkey caller assembly relative to the support assembly 18 beyond the second end wall structure that is arranged spaced from and parallel the first side wall's first end wall 39, that in turn mounts a plug member, to be discussed in more detail below.

The first side wall first end wall 39 includes an internally threaded cylindrical cavity 40 (see FIG. 5) that is arranged for threaded reception of an externally threaded plug member 41 that includes a plug head 42 for ease of manual grasping or rotation for ease of insertion or removal of the plug member 41 relative to the cylindrical cavity 40. To this end, matches 44 may be stored within the cylindrical cavity 40 for subsequent use maintained in a relatively dry condition within the cavity 40. An abrasive wall 43 is formed within a forward end surface of the plug member 41 that projects interiorly of the cavity 40 for use as a striking surface relative to an associated match member 44, as indicated in FIG. 7.

The FIG. 8 illustrates the use of a modified support assembly 18a having a knife housing 48 arranged coextensively and fixedly to a bottom surface of the floor 19. The knife housing 48 includes a knife housing cavity 49 arranged in a parallel relationship relative to the floor 19, with the knife housing cavity 49 arranged in sliding reception of a knife blade 50 therewithin. The knife member 51 includes a hilt flange 52 that is arranged in engagement with spring fingers 53 positioned on opposed sides of the knife housing cavity's entrance opening for directing access of the knife blade 50 within the knife cavity 49, as illustrated in FIG. 8.

As to the manner of usage and operation of the instant invention, the same should be apparent from the above disclosure and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A turkey caller and support apparatus, comprising, a turkey caller assembly, and a support assembly, wherein the turkey caller assembly is arranged for complementary and sliding reception within the support assembly, the turkey caller assembly includes a sound chamber cooperative with an actuator means for effecting audible sound production from the upper chamber, wherein the turkey caller assembly includes a turkey caller assembly first side wall and a turkey caller assembly second side wall arranged in a spaced parallel relationship relative to one another, with the first side wall including a first side wall rib, the second side wall including a second side wall rib, and the turkey caller assembly including a turkey caller bottom wall, wherein the first side wall rib and the second side wall rib are spaced an equal distance relative to the turkey caller bottom wall, and a first dove tail flange and a second dove tail flange coplanar with the bottom wall and extends beyond the turkey caller first side wall and the turkey caller second side wall respectively, and the support assembly includes a support assembly floor, and a support assembly first side wall having a first side wall interior surface, and the first side wall interior surface including a first side wall interior surface groove in sliding reception of the turkey caller first side wall rib, and the support assembly having a support assembly second side wall, the support assembly second side wall including a second side wall first boss parallel to the support assembly first side wall and the second side wall first boss having a second side wall first boss interior surface including a first boss groove for sliding reception of the turkey caller second side wall rib.

2. An apparatus as set forth in claim 1 wherein the support assembly includes a second boss parallel and spaced from the first boss, and a rail member extending from the first boss to the second boss having an access opening between the rail member and the support assembly floor for access to the turkey caller assembly within the support assembly.

3. An apparatus as set forth in claim 2 including an arcuate mounting plate fixedly mounted coextensively to the support assembly first side wall, with the mounting plate including a concave surface, and the mounting plate including an upper edge and a lower edge, wherein the lower edge includes a plurality of first straps mounted to the lower edge, and the upper edge includes a plurality of first strap slots for reception of the first straps, and a second strap mounted in adjacency to the upper edge, and a second strap slot directed through the mounting plate in adjacency to the lower edge for receiving the second strap therethrough, wherein the first straps and the second strap are arranged for securement about an individual during transport of the support assembly.

4. An apparatus as set forth in claim 3 including a first fastener elastomeric web extending from the support assembly first side wall to the first boss, and a second fastener elastomeric web extending from the support assembly first side wall to the first boss.

5. An apparatus as set forth in claim 4 wherein the support assembly first side wall includes a first side wall first end wall, and the first end wall includes an internally threaded cylindrical cavity, and an externally threaded plug threadedly received within the cylindrical cavity, and the externally threaded plug having a plug head arranged for abutment on the first side wall first end wall, and the externally threaded plug having an abrasive plug wall positioned within the internally threaded cylindrical cavity, and matches contained within the cylindrical cavity, with the abrasive plug wall arranged for use as a striking surface for said matches.

6. An apparatus as set forth in claim 5 including a knife housing mounted coextensively and integrally to the support assembly floor below the support assembly first side wall, and the knife housing having a knife housing cavity arranged parallel to the floor, and a knife member, the knife member having a hilt flange and a knife blade in sliding communication with the knife housing cavity, and a plurality of spring fingers fixedly mounted to the knife housing on opposed sides of the knife housing cavity for selective cooperation with the hilt flange.

* * * * *